（12）United States Patent
Patidar et al.

(10) Patent No.: US 9,208,338 B2
(45) Date of Patent: Dec. 8, 2015

(54) METHOD AND APPARATUS FOR SECURELY EXECUTING MULTIPLE ACTIONS USING LESS THAN A CORRESPONDING MULTIPLE OF PRIVILEGE ELEVATION PROMPTS

(75) Inventors: Mansukh Patidar, Greater Noida (IN); Saurabh Gupta, New Delhi (IN); Aditya Falodiya, Noida (IN); Gaurav Modi, Patiala (IN); Amit Batra, New Delhi (IN); Tarun Garg, New Delhi (IN); Piyush Gupta, Pitiala (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 436 days.

(21) Appl. No.: 13/558,446

(22) Filed: Jul. 26, 2012

(65) Prior Publication Data

US 2014/0033321 A1    Jan. 30, 2014

(51) Int. Cl.
*G06F 21/62*    (2013.01)

(52) U.S. Cl.
CPC .... *G06F 21/6218* (2013.01); *G06F 2221/2141* (2013.01); *G06F 2221/2145* (2013.01)

(58) Field of Classification Search
None
See application file for complete search history.

(56) References Cited

U.S. PATENT DOCUMENTS

| | | | | |
|---|---|---|---|---|
| 6,047,377 | A * | 4/2000 | Gong | 726/21 |
| 8,656,465 | B1 * | 2/2014 | Fong-Jones | 726/5 |
| 8,745,401 | B1 * | 6/2014 | Hintz et al. | 713/176 |
| 2004/0199763 | A1 * | 10/2004 | Freund | 713/154 |
| 2005/0021981 | A1 * | 1/2005 | Phillips et al. | 713/182 |
| 2007/0186102 | A1 * | 8/2007 | Ng | 713/165 |
| 2007/0198933 | A1 * | 8/2007 | van der Bogert et al. | 715/741 |
| 2008/0046371 | A1 * | 2/2008 | He et al. | 705/51 |
| 2008/0178285 | A1 * | 7/2008 | Perlman et al. | 726/21 |
| 2009/0007256 | A1 * | 1/2009 | Raymond et al. | 726/19 |
| 2010/0257596 | A1 * | 10/2010 | Ngo et al. | 726/7 |
| 2010/0306775 | A1 * | 12/2010 | Appiah et al. | 718/100 |
| 2011/0030036 | A1 * | 2/2011 | Wells, Jr. | 726/4 |
| 2013/0239166 | A1 * | 9/2013 | MacLeod et al. | 726/1 |

* cited by examiner

*Primary Examiner* — Samson Lemma
*Assistant Examiner* — Abdulhakim Nobahar
(74) *Attorney, Agent, or Firm* — Keller Jolley Preece

(57) ABSTRACT

A method and apparatus for securely executing a plurality of actions requiring elevated privilege using less than a corresponding plurality of prompts for privilege elevation, and in some embodiments, only a single prompt for privilege elevation, comprising: receiving a request to perform a first action requiring an elevated privilege; acquiring the elevated privilege to perform the first action; executing the first action, wherein the first action is executed based on the elevated privilege; receiving a request to perform a second action requiring an elevated privilege; and executing the second action using the elevated privilege acquired for the first action.

20 Claims, 5 Drawing Sheets

METHOD AND APPARATUS FOR SECURELY EXECUTING MULTIPLE ACTIONS USING LESS THAN A CORRESPONDING MULTIPLE OF PRIVILEGE ELEVATION PROMPTS

BACKGROUND OF THE INVENTION

1. Field of the Invention

Embodiments of the present invention generally relate to executing multiple actions requiring elevated privilege and, more particularly, to a method and apparatus for securely executing multiple actions using less than a corresponding multiple of prompts for privilege elevation without compromising on security.

2. Description of the Related Art

Computer users often download software applications and software upgrades onto their computers. To install new applications or upgrades of applications, an elevated level of privilege, such as elevation from a user privilege level to an administrator privilege level, is required. Elevated privileges are required because such actions make changes in secure locations on the system and may even change system level properties. For security purposes, an elevated privilege prompt is displayed each time a user requests the "download and install" of an application or an upgrade. When a user makes multiple independent requests a privilege elevation prompt is required for each independent source. For example, a user may request installation of an application that, during the installation process, presents to the user installation options, which, if selected, result in the installation process requiring connection to one or more other sources. Before connection to one or more other sources is allowed to be made, a corresponding number of one or more privilege elevation prompts are required. Although the requirement of a prompt for elevated privilege for each further connection is needed to help ensure security, such multiple prompts degrade the user experience.

Therefore, there is a need for a method and apparatus for securely executing a plurality of actions using less than a corresponding plurality of prompts for privilege elevation.

SUMMARY OF THE INVENTION

Embodiments of the invention relate to a method and apparatus for securely executing a plurality of actions using less than a corresponding plurality of prompts for privilege elevation, and in some embodiments, only a single prompt for privilege elevation. The method and apparatus comprise receiving a request to perform a first action requiring an elevated privilege. The method and apparatus acquire the elevated privilege to perform the first action and execute the first action, wherein the first action is executed based on the elevated privilege. The method and apparatus then receive a request to perform a second action requiring an elevated privilege and execute the second action using the elevated privilege acquired for the first action.

Figure 1:
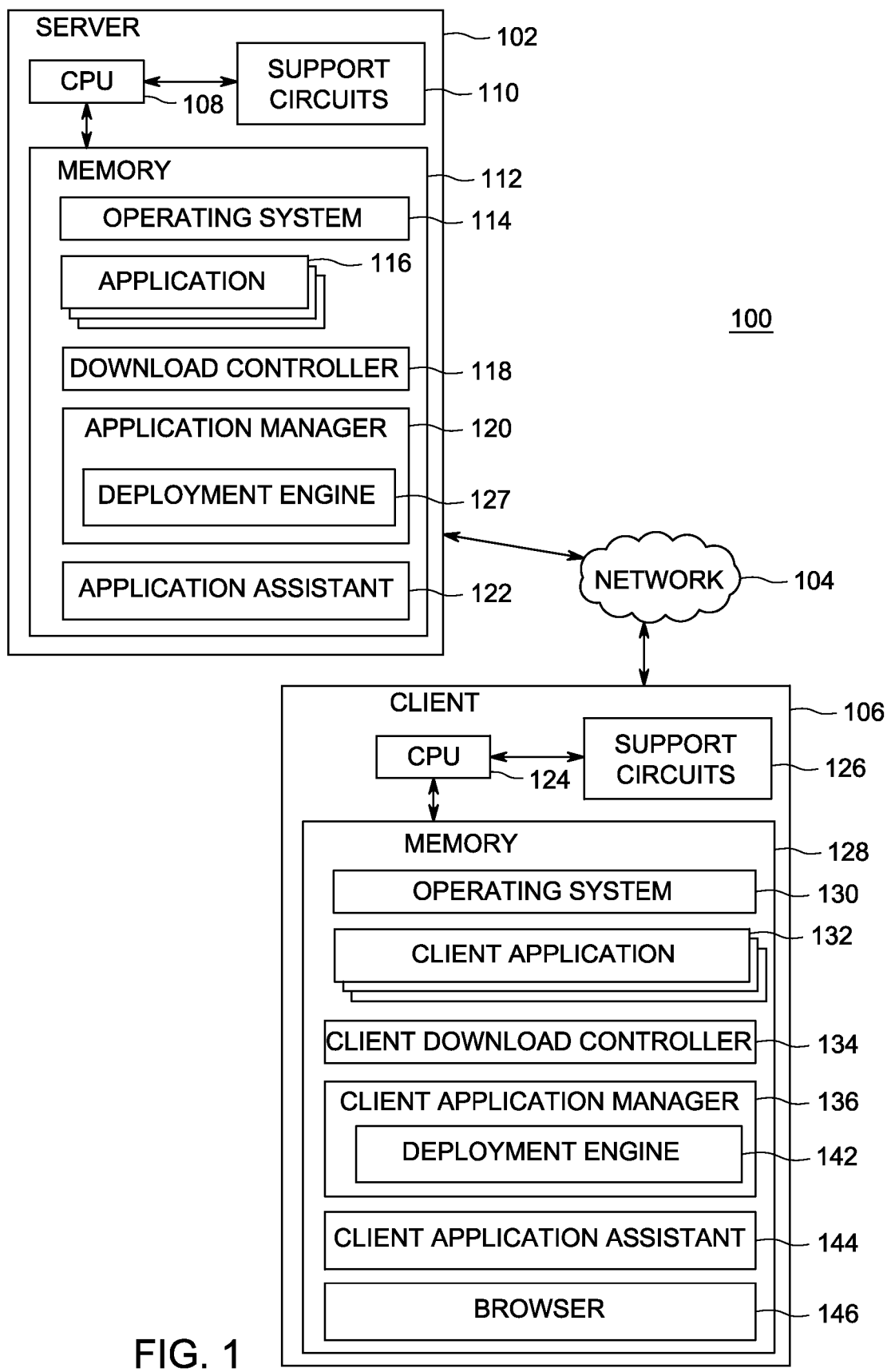
FIG. 1 depicts a block diagram of a system for securely executing multiple actions using less than a corresponding multiple of prompts for privilege elevation, according to one or more embodiments of the invention.

While the method and apparatus is described herein by way of example for several embodiments and illustrative drawings, those skilled in the art will recognize that the method and apparatus for securely executing a plurality of actions using less than a corresponding plurality of prompts for privilege elevation are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for securely executing multiple actions using single prompt for privilege elevation as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for securely executing a plurality of actions that require elevated privileges using less than a corresponding plurality of prompts for privilege elevation. Embodiments provide a method and apparatus for installing multiple applications via a single application. For example, embodiments of the invention provide a way to download all products offered, for example, under ADOBE® Creative Cloud Membership using elevated privileges secured via a single elevation prompt for a single application, for example, ADOBE® Application Manager.

A download controller is downloaded onto a client computer. The client download controller has a client application assistant embedded within it. In some embodiments, in order to create a secure inter-process communication (IPC) connection with the client application assistant when the client application assistant is launched, the client download controller generates a first named pipe name and opens a first IPC connection. The IPC connection is made using a named pipe mechanism for establishing a restricted access read and write communication link between the client download controller and a client application assistant. While exemplary embodiments described herein use a named pipe mechanism of IPC, those skilled in the art will recognize other mechanisms for IPC, such as shared memory, OS level events and notifications, and the like. The client download controller opens the connection and passes the pipe name to the client application assistant as a command line argument while launching the client application assistant. The client application assistant connects to the named pipe.

A three-way handshake is performed between the client download controller and the client application assistant in order to ensure the IPC connection is secure. The three-way handshake is initiated when the client application assistant sends a synchronization message to the client download controller. When the client download controller receives the synchronization message, the client download controller sends an authorization message back to the client application assistant. The authentication is encrypted with a token containing a MD5 hash. The MD5 hash may comprise a combination of components that make the authentication message secure, such as a component of proprietary information and a component of time. The authentication message also contains a process ID indicating the process that generated the authentication message. When the client application assistant receives the authentication message, the client application assistant authenticates the message by verifying that the timestamp is within an acceptable timeframe. The client application assistant uses an image process path using the process ID and authenticates a digital signature of the process. When the authentication message verification is complete, the client application assistant sends an authorization response message to the client download controller providing the success or failure of the validation. Upon successful validation of the first IPC connection, the client download controller will attempt to install a client application manager. A privilege elevation prompt is displayed before the client application manager is installed. The privilege elevation will allow changes to be made to secure areas of the computer, typically during download and installation of software applications and upgrades. If privilege elevation is achieved, the client application manager is installed. Once the client application manager is installed, the client download controller generates a second 'named pipe' name and the client application assistant closes the first IPC connection. The client application assistant then opens the IPC connection on the second named pipe. The client download controller passes the named pipe name to the client application manager as a command line argument while launching the client application manager. The client application manager connects to the second pipe.

The three-way handshake is performed between the client application manager and the client application assistant in the same manner as performed between the client download controller and the client application assistant. Once privilege elevation is achieved over the secure connection, an action requiring elevated privileges may be requested, such as a download and install of an application or update, and it will be executed without requiring an addition privilege elevation.

Upon receipt of a request, the client application manager sends an action message to the client application assistant. The action message contains an action type (for example, create process) and action arguments (for example, executable path and arguments). The client application assistant will only execute the action if the digital signature on the executable is authenticated. This security measure ensures unauthorized programs that may harm the system are not executed on the computer. The client application assistant sends an action output message to the client application manager providing the success or failure of the action. Additional actions may be requested while the secure connection exists. No additional privilege elevation will be requested for these additional actions.

Advantageously, embodiments of the invention allow for a single elevation of privileges when performing multiple actions, such as installation, licensing, updating and the like. Embodiments of the invention also provide a mechanism for securing elevation privileges to avoid misuse that may be extended to any number of multiple ad-hoc action executions requiring elevated privileges.

Various embodiments of an apparatus and method for securely executing a plurality of actions using less than a corresponding plurality of prompts for privilege elevation are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a system 100 for securely executing a plurality of actions using less than a corresponding plurality of prompts for privilege elevation, according to one or more embodiments of the invention. The system 100 comprises a server 102 and a client 106 connected to each other via a network 104. The server 102 comprises a CPU 108, support circuits 110 and a memory 112. The CPU 108 may comprise one or more commercially available microprocessors or microcontrollers that facilitate data processing and storage. The various support circuits 110 facilitate the operation of the CPU 108 and include one or more clock circuits, power supplies, cache, input/output circuits, displays, and the like. The memory 112 comprises at least one of Read Only Memory (ROM), Random Access Memory (RAM), disk drive storage, optical storage, removable storage and/or the like. The memory 112 comprises a plurality of applications 116, a download controller 118, an application manager 120, and an application assistant 122. The application manager 120 comprises a deployment engine 127. The application manager 120 may be any application manager, such as ADOBE® Application Manager, provided by Adobe Systems Incorporated of San Jose, Calif., capable of managing file downloads. In some embodiments, the server 102 does not run the application manager 120 or the application assistant 122 but provides the service of downloading these files to the client computer 106.

According to some embodiments, the plurality of applications 116 are products that are made available on the server 102 for download onto the client computer 106, and include software applications, software updates, and the like.

The client computer 106 comprises a CPU 124, support circuits 126 and a memory 128. The client computer 106 is a type of computing device (e.g., a laptop, a desktop, a Personal Digital Assistant (PDA) and/or the like). The CPU 124 may comprise one or more commercially available microprocessors or microcontrollers that facilitate data processing and storage. The various support circuits 126 facilitate the operation of the CPU 102 and include one or more clock circuits, power supplies, cache, input/output circuits, displays, and the like.

The memory 128 comprises at least one of Read Only Memory (ROM), Random Access Memory (RAM), disk drive storage, optical storage, removable storage and/or the like. The memory 128 comprises an operating system 130, at least one client application 132, a client download controller 134, a client application manager 136, a client application assistant 144 and a browser 146. The client application manager 136 comprises a deployment engine 142. According to some embodiments of the invention, the operating system (OS) 130 generally manages various computer resources (e.g., network resources, file processors, and/or the like). The operating system 130 is configured to execute operations on one or more hardware and/or software modules, such as Network Interface Cards (NICs), hard disks, virtualization layers, firewalls and/or the like. Examples of the operating system 130 may include, but are not limited to, Linux, Mac OSX, BSD, UNIX, Microsoft Windows, and the like.

According to some embodiments, the browser 146 allows download and installation of the client download controller 134 from the server 102 to the client 106. According to one or more embodiments, the download controller 118 carries the client application assistant 122 embedded within itself as a resource. In other embodiments, the application assistant 122 is a separate process. The first time a request for a product download is received from a client computer 106, the download controller 118, with the application assistant 122, is downloaded onto the client computer 106. The client download controller 134 has a client application assistant 144 embedded within it. In some embodiments, in order to create a secure connection with the client application assistant 144 when the client application assistant 144 is launched, the client download controller 134 generates a first named pipe name and opens a first inter-process communication (IPC) connection. In other embodiments, other mechanisms of IPC are used, such as shared memory, OS level events and notifications, and the like. The IPC connection is made using a named pipe mechanism for establishing a restricted access read and write communication link between the client download controller 134 and a client application assistant 144. A named pipe is a easy way to directly transmit data from one point to another. The client download controller 134 opens the connection and passes the pipe name to the client application assistant 144 as a command line argument while launching the client application assistant 144. The client application assistant 144 connects to the named pipe.

A three-way handshake is performed between the client download controller 134 and the client application assistant 144 in order to ensure the IPC connection is secure. Any failure during the three-way handshake, results in a fatal error and the download process is terminated. The three-way handshake is initiated when the client application assistant 144 sends a synchronization message to the client download controller 134. When the client download controller 134 receives the synchronization message, the client download controller 134 sends an authorization message back to the client application assistant 144. The authentication is encrypted with a token containing a MD5 hash. The MD5 hash may comprise a combination of components that make the authentication message secure, such as a component of proprietary information and a component of time. The authentication message also contains a process ID indicating the process that generated the authentication message. When the client application assistant 144 receives the authentication message, the client application assistant 144 authenticates the message by verifying that the timestamp is within an acceptable timeframe. The client application assistant 144 uses an image process path using the process ID and authenticates a digital signature of the process. When the authentication message verification is complete, the client application assistant 144 sends an authorization response message to the client download controller 134 providing the success or failure of the validation. Upon successful validation of the first IPC connection, the client download controller 134 will attempt to install a client application manager 136. A privilege elevation prompt is displayed before the client application manager 136 is installed. In some embodiments, the privilege elevation prompt is in the form of a login of an administrative user, wherein the administrative user has the privilege to authorize installations on the client computer 106. In other embodiments, a simple message is displayed, for example, "Do you want this process to make changes to your computer?" Buttons for "YES" and "CANCEL" may be displayed with the message. The privilege elevation will allow changes to be made to secure areas of the computer, typically during download and installation of software applications and upgrades. If privilege elevation is achieved, the client application assistant 144 runs with elevated privileges and installs the client application manager 136. Once the client application manager 136 is installed, the client download controller 134 generates a second 'named pipe' name and the client application assistant 144 closes the first IPC connection. The client application assistant 144 then opens the IPC connection on the second named pipe. The client download controller 134 passes the named pipe name to the client application manager 136 as a command line argument while launching the client application manager 136. The client application manager 136 connects to the second pipe.

The three-way handshake is performed between the client application manager 136 and the client application assistant 144 in the same manner as performed between the client download controller 134 and the client application assistant 144 above in order to ensure a secure connection.

Upon successful authentication, actions that are requested are verified using digital signature authentication. If the requested action is verified, the client application assistant 144 executes the action without an additional privilege elevation prompt. The actions are executed using the secure authenticated connection and with the elevated privileges established for the client application assistant 144.

Figure 2:
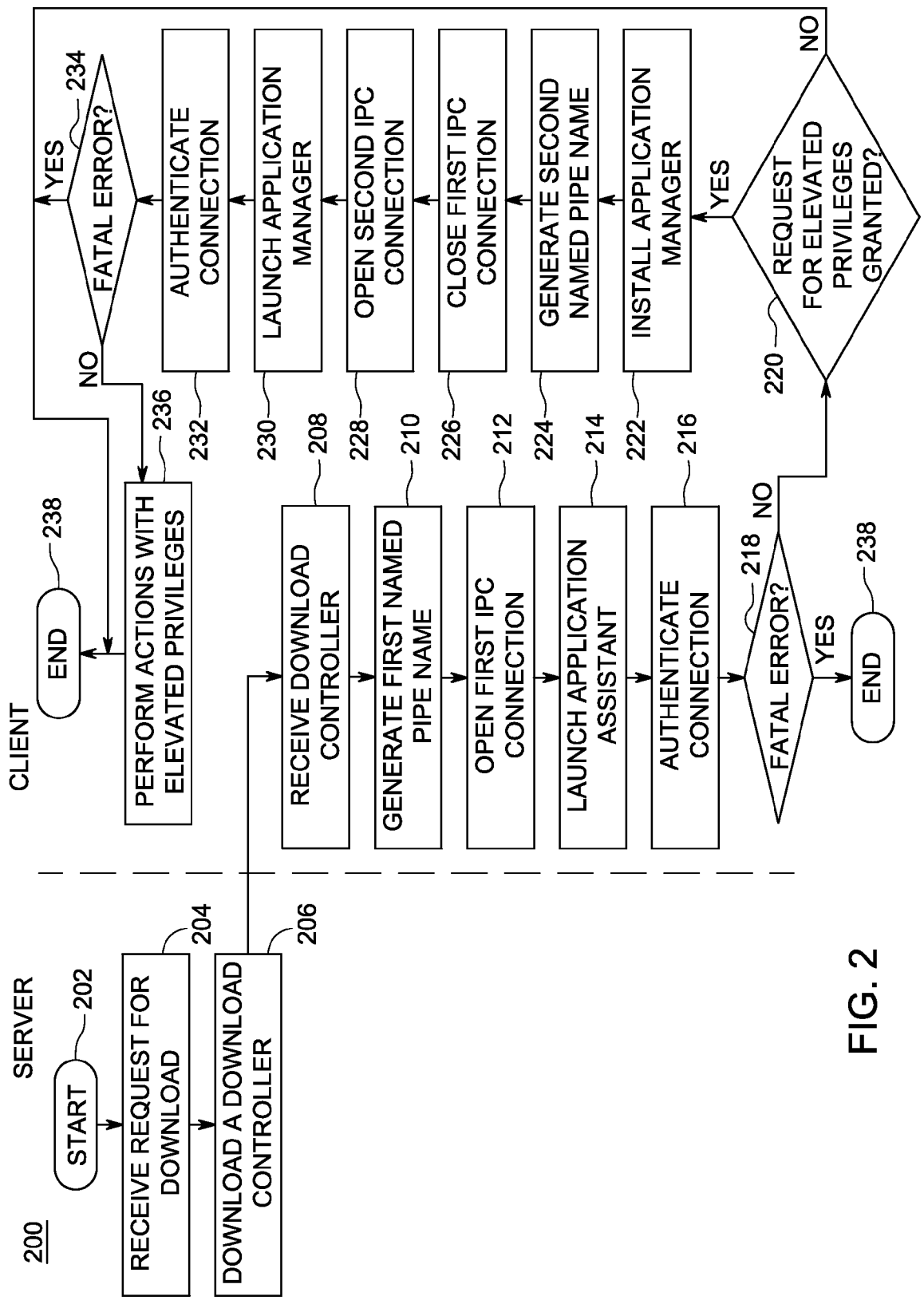
FIG. 2 depicts a flow diagram for method for establishing a secure connection and executing multiple actions using less than a corresponding multiple of prompts for privilege elevation using the system of FIG. 1, according to one or more embodiments of the invention.

FIG. 2 depicts a flow diagram for method 200 for establishing a secure connection and executing a plurality of actions using less than a corresponding plurality of prompts for privilege elevation as implemented on the client 106 of system 100 in FIG. 1, according to one or more embodiments of the invention. The method 200 starts at step 202 and proceeds to step 204. At step 204, the method 200 receives a request to download a product, such as a software application. The method 200 proceeds to step 206. At step 206, the method 200 facilitates downloading a download controller to a client computer. The download controller may contain within it an application assistant process. The method 200 proceeds to step 208.

At step 208, the method 200 receives the client download controller. The method 200 proceeds to step 210, where the method 200 generates a first 'named pipe' name. The method 200 proceeds to step 212, where the client download controller opens a first IPC connection on the first named pipe. The method 200 proceeds to step 214, where the method 200 launches the client application assistant and passes the pipe name to the client application assistant as a command line argument and the client application assistant connects to the first IPC connection. The method 200 proceeds to step 216, where the method 200 authenticates the connection established as described in further detail with respect to FIG. 3 below. The method 200 proceeds to step 218, where the method 200 determines whether a fatal error was returned as an outcome of step 216, meaning a secure connection was not established. If the method 200 determines a fatal error was returned, the method 200 proceeds to step 238. If at step 218, the method 200 determines a fatal error is not returned, meaning a secure connection was established, the method 200 proceeds to step 220. At step 220, the method 200 determines whether a request for elevated privileges is granted. The method 200 displays a privilege elevation prompt. In some embodiments, the privilege elevation prompt may be via a user interface (UI) wherein a login is requested by a user with administrative privileges. In some embodiments, the privilege elevation prompt may be via the UI display reading, "May this program make changes to your computer?" A response of "Yes" would result in elevated privileges. If the method 200 determines that the request for elevated privileges is denied, the method 200 proceeds to step 238 and ends. However, if at step 220, the method 200 determines that the request for elevated privileges is granted the method 200 proceeds to step 222. The client application assistant is now running with elevated privileges At step 222, the method 200 installs a client application manager. Typically, the installation of a client application manager would require an additional privilege elevation prompt. However, because the elevated privileges have already been established for the client application assistant, and the installation of the client application manager is running under the elevated privilege of the client application assistant, the client application manager does not require an additional privilege elevation prompt. The method 200 proceeds to step 224.

At step 224, the method 200 generates a second 'named pipe' name. In order to ensure security, the method 200 generates a new named pipe for communication between the client application assistant and the client application manager. The method 200 proceeds to step 226, where the method 200 closes the first IPC connection. The method 200 proceeds to step 228, where the client application assistant opens a second IPC connection on the second named pipe. The method 200 proceeds to step 230, where the method 200 launches the client application manager and passes the second pipe name to the client application manager as a command line argument. Upon launch, the client application manager connects to the second IPC connection. The method 200 proceeds to step 232.

At step 232, the method 200 authenticates the connection established as described in further detail with respect to FIG. 3 below. The method 200 proceeds to step 234, where the method 200 determines whether a fatal error was returned at step 232, meaning a secure connection was not established. If the method 200 determines a fatal error was returned, the method 200 proceeds to step 238. If at step 232, a fatal error was not returned, meaning a secure connection was established, the method 200 proceeds to step 236. At step 236, the method 200 performs actions that require elevated privileges without additional privilege elevation prompts, as described in further detail with respect to FIG. 4 below. The method 200 proceeds to step 238. At step 238, the method 200 ends.

Figure 3:
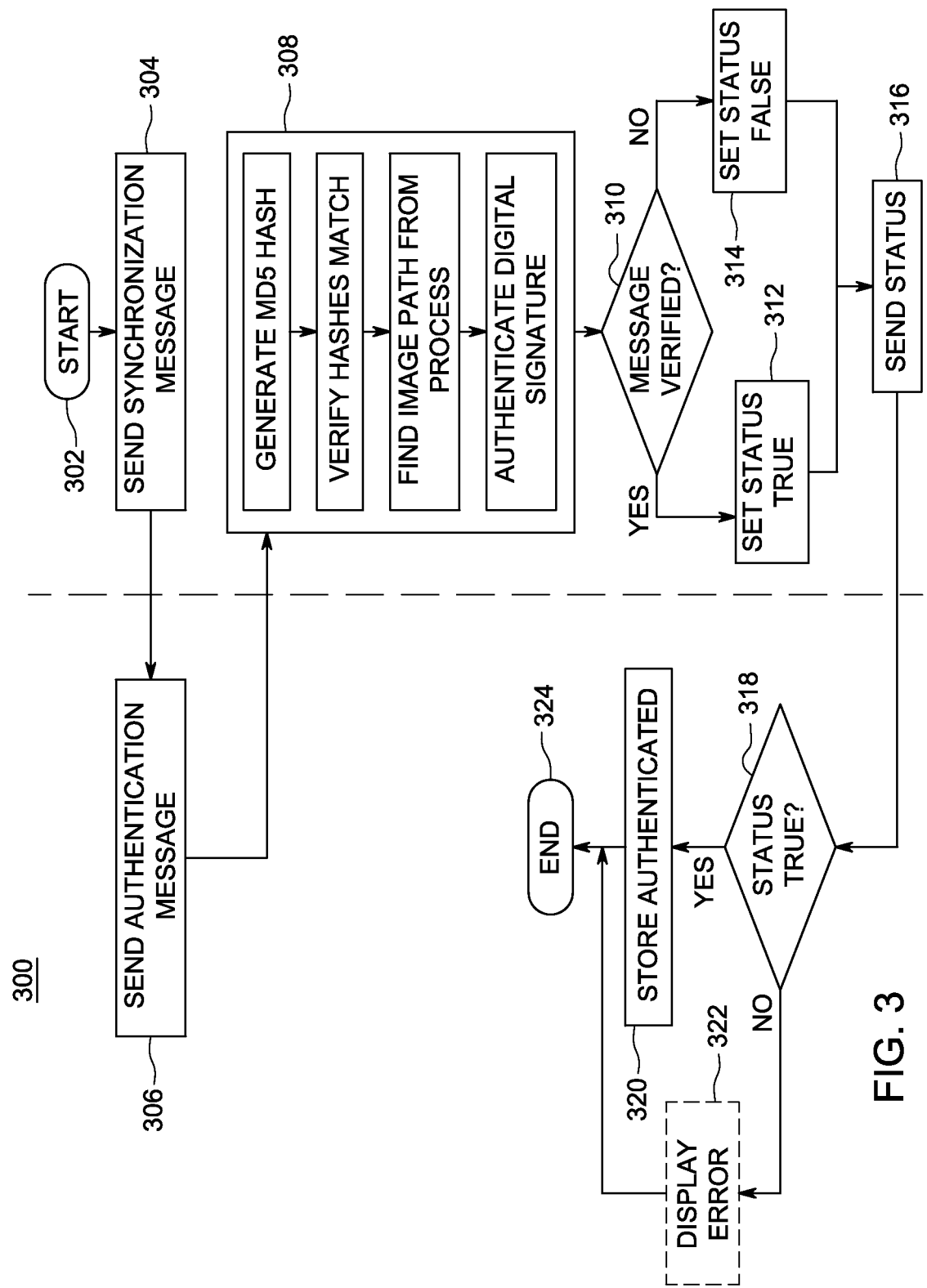
FIG. 3 depicts is a flow diagram of a method for establishing a secure inter-process communication (IPC) connection between the client download controller and the client application assistant and between the client application assistant and the client application manager on the system of FIG. 1, according to one or more embodiments of the invention.

FIG. 3 depicts a flow diagram of a method 300 for establishing a secure inter-process communication (IPC) connection between the client download controller 134 and the client application assistant 144 and between the client application assistant 144 and the client application manager 136 on the system 100 of FIG. 1, according to one or more embodiments of the invention. Prior to executing the method 300, both the client application manager and the client application assistant process have been launched and are connected to the named pipe. As described below, the flow of information is secure across the IPC connection by use of various security strategies such as, time expiring tokens, MD5 hashes, encrypted messages, and validation of actions to be executed. Further, at each instance that a security measure is not complied with, such as on expiry of time expiring tokens, the method 300 produces a fatal error and the method 300 exits.

The method 300 starts at step 302 and proceeds to step 304. At step 304, the method 300 directs a synchronization message (SYNC) from the client application assistant to the client application manager. The synchronization message is a plain text format message:

```
<msg>
    <msgID>SYNC</msgID>
</msg>
```

The method 300 awaits the synchronization message until a predetermined timeout period ($T_{SYNC}$). The $T_{SYNC}$ is a time expiring token used by the method 300 for making the transmission across the IPC connection secure. If the SYNC message is not received until $T_{SYNC}$, the method 300 gives a fatal error. Upon successfully receiving the SYNC message, the method 300 proceeds to step 306. At step 306, the method 300, upon the client application manager's receipt of the synchronization message, directs an authentication message from the client application manager to the client application assistant. The authentication message is encrypted with a token containing a MD5 hash. The MD5 hash may comprise a combination of components that make the authentication message secure, such as a component of proprietary information and a component of time. The authentication message also contains a process ID indicating process that generated the authentication message. The authentication message is a plain text format message:

```
<msg>
    <msgID>AUTH</msgID>
    <token>{MD5-hash}</token>
    <pid>{processID}</pid>
</msg>
```

The method 300 proceeds to step 308. At step 308, the method 300 verifies the authentication message. The method 300 generates an MD5 hash using the same components that were used to generating the hash in the authentication message and compares the generated hash with the hash received in the authentication message to ensure they match. The method 300 then finds an image path from the process ID in the authorization message. The method 300 authenticates the digital signature of the process ID. It is appreciated that although FIG. 3 illustrates multiple steps utilized to verify the authentication message, other embodiments of the present disclosure envision omitting one or more of these step. Still other embodiments envision verification of the authentication message including additional steps. The method 300 proceeds to step 310.

At step 310, the method 300 determines whether the authentication message is authentic. If the authentication message is authentic, the method 300 proceeds to step 312, where the method 300 sets the authentication status to TRUE. The method 300 proceeds to step 316. If at step 310, the method 300 determines the authentication message is not authentic, the method 300 proceeds to step 314, where the method 300 sets the authentication status to FALSE. The method 300 proceeds to step 316.

At step 316, the method 300 directs an authentication response message from the client application assistant to the client application manager. The client application response message informs the client application manager of the results of the authentication. The authentication response message is a plain text format message:

```
<msg>
    <msgID>AUTH_RESP</msgID>
    <eStatus>true</eStatus>
    <signStatus>true</signStatus>
</msg>
```

The method 300 awaits authentication for a predetermined number ($N_{AUTH}$) of times and awaits the authentication response message for a predetermined timeout period ($T_{AUTH}$). Both, the $T_{SYNC}$ and $T_{AUTH}$ are used by the method 300 for making the transmission across the IPC connection secure. If the method 300 does not receive AUTH_RESP within $T_{SYNC}$, the method 300 gives a fatal error. Similarly, if the method 300 does not receive AUTH_RESP after $N_{AUTH}$ trials, the method 300 gives a fatal error. If AUTH_RESP is received, the method 300 proceeds to step 318, where the method 300 evaluates the authentication status. If the authentication status is TRUE, the method 300 proceeds to step 320. At step 320, the method 300 records that the connection between the client application manager and the client application assistant is secure. The method 300 proceeds to step 324. If at step 318, the method 300 determines the authentication status is FALSE, the method 300 returns a fatal error. The method 300 proceeds to step 324, where the method 300 ends.

Figure 4:
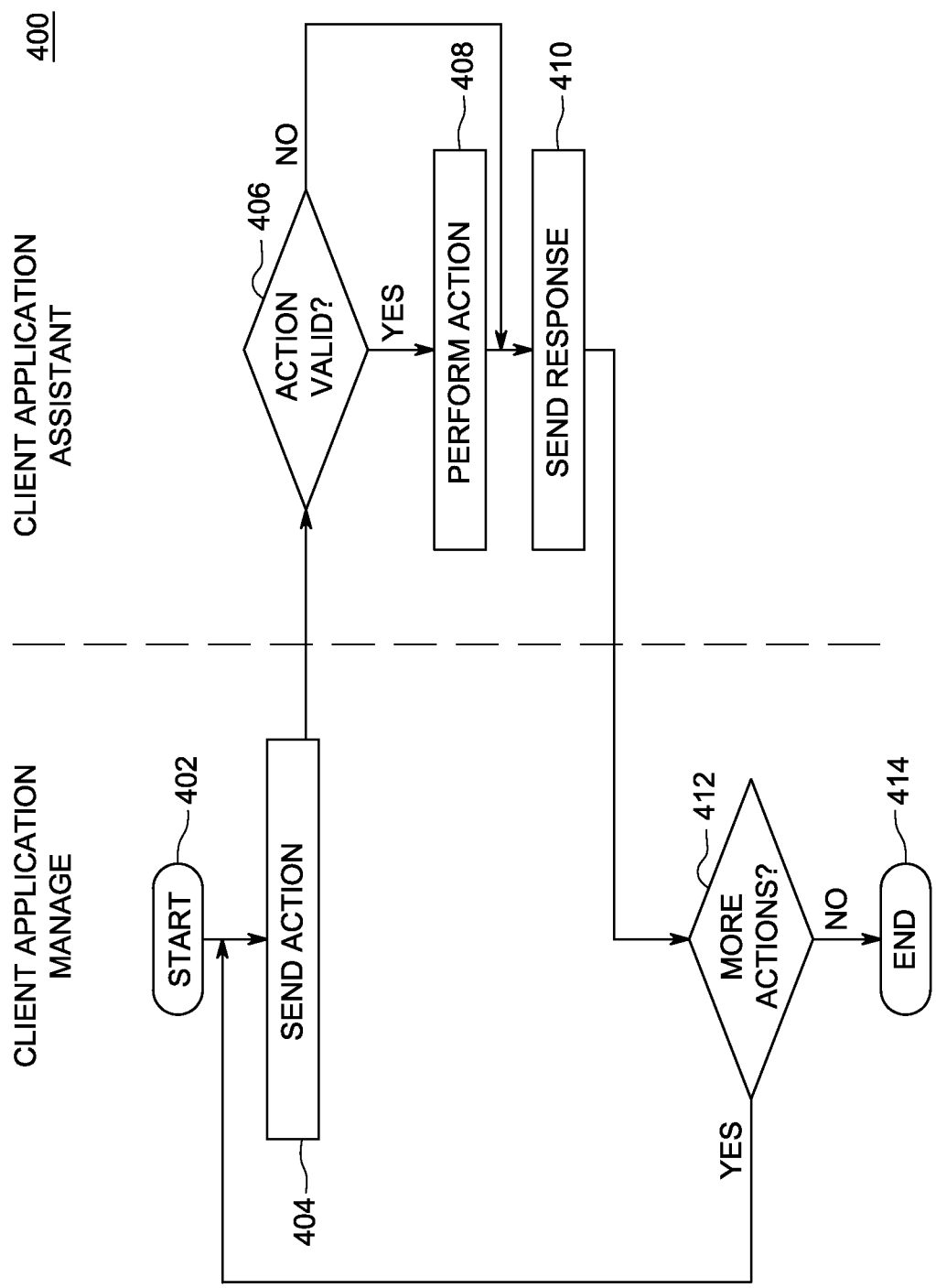
FIG. 4 depicts a flow diagram of a method for performing actions that require elevated privileges without additional privilege elevation prompts, as performed by the client application assistant of FIG. 1, according to one or more embodiments of the invention.

FIG. 4 depicts a flow diagram of a method 400 for performing actions that require elevated privileges without additional privilege elevation prompts, as performed by the client application assistant 144 of FIG. 1, according to one or more embodiments of the invention.

The method 400 starts at step 402 and proceeds to step 404. At step 404, the method 400 directs an action message to launch an executable. The action message may be a request to deploy an application or an update to an application. The action message contains an executable process comprised of an action type (create process) and action arguments (executable path and arguments). The action message is a plain text format:

ACTION message (plain text form)

```
<action>
    <actionType>createProcess</actionType>
    <actionArgs>
        <execPath>{exec full path}</execPath>
        <cmdArgs>
        <cmdArg>--appletID=AAM_UI</cmdArg>
        <cmdArg>--appletVersion=1.0</cmdArg>
        <cmdArg>--inputXmlPath="D:\test\product.xml"</cmdArg>
        <cmdArg>--workflow=AAM_workflow_launch</cmdArg>
        </cmdArgs>
    </actionArgs>
</action>
```

The method 400 proceeds to step 406, where the method 400 determines whether the action is a process certified to be safe. The method 400 will not execute any process that may harm the system. The method 400 authenticates a digital signature of the process. If the digital signature is authenticated, the process is validated as safe and the method 400 proceeds to step 408, where the method 400 launches the process requested in the action message. The method 400 proceeds to step 410, where the method 400 directs an action output message to the deployment engine of the client application manager. The action output message is a plain text format:

In the case of success, output is:

```
<output>
    <result>Success</result>
</output>
```

In case of failure, if an error code is not available

```
<output>
    <result>Fail</result>
</output>
```

In the case of failure, if an error code is available:

```
<output>
    <result>Fail</result>
    <errCode>...</errCode>
</output>
```

In the case of a failure, if an error code is available, the method 400 displays an appropriate error message. The method 400 proceeds to step 412, where the method 400 awaits a request to execute more actions. The method 400 executes any further actions requested as long as the secure connection is maintained and the process requested passes validation at step 406. The method 400 executes these actions without requiring an elevated privilege prompt. When an action request is received to deploy more products, the method 400 proceeds to step 404. The method 400 iterates as long as the secure connection exists at which time the method 400 proceeds to step 414 and ends.

Although in the illustrated embodiment processes are validated via step 406, in some embodiments, such validation may not be desired.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 5:
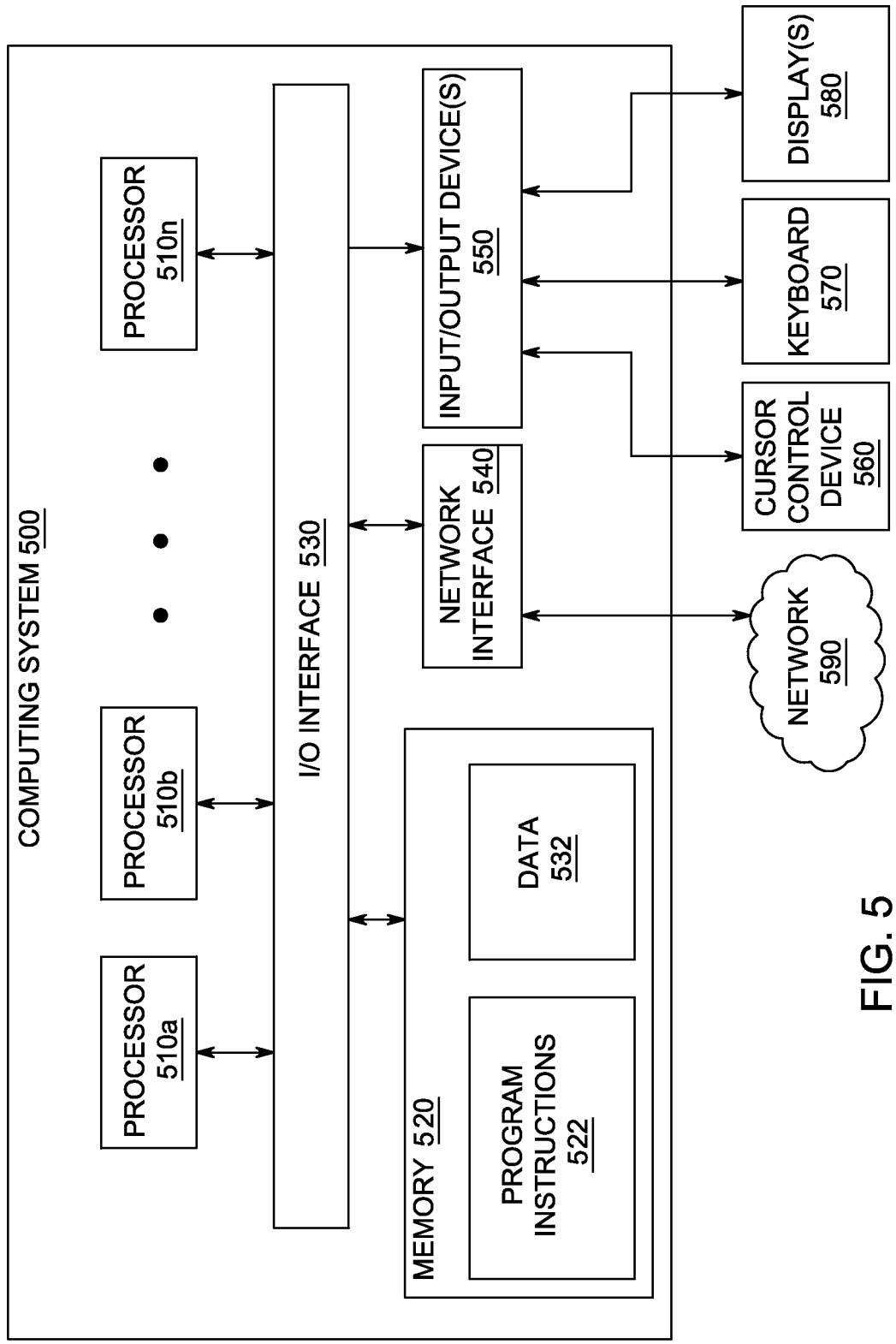
FIG. 5 depicts a computer system that can be used to implement the methods of FIG. 2 and FIG. 3 in various embodiments of the present invention, according to one or more embodiments of the invention.

FIG. 5 depicts a computer system that can be used to implement the methods of FIG. 2 and FIG. 3 in various embodiments of the present invention, according to one or more embodiments of the invention.

Various embodiments of method and apparatus for securely executing a plurality of actions using less than a corresponding plurality of prompts for privilege elevation, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement methods 200, 300, and 400 as processor-executable executable program instructions 522 (e.g., program instructions executable by processor(s) 510) in various embodiments.

In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of components may be utilized by the system to receive user input described above. In various embodiments, a user interface (e.g., user interface) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touch pads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowchart of FIG. 2, FIG. 3, and FIG. 4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for securely executing a plurality of actions that each require an elevated privilege using a single elevated privilege comprising:
   receiving, by at least one processor, a request to perform an action for a first application, wherein performing the action for the first application requires an elevated privilege, the elevated privilege being elevated with respect to a current privilege;
   acquiring the elevated privilege to perform the action for the first application;
   executing, by at least one processor, the action for the first application, wherein the action is executed based on the elevated privilege;
   receiving, by the at least one processor, a request to perform the action for a second application that differs from the first application, wherein performing the action for the second application requires an elevated privilege; and
   executing, by the at least one processor, the action for the second application using the elevated privilege acquired for performing the action for the first application.

2. The method of claim 1, further comprising establishing and verifying security of an inter-process communication (IPC) connection between a client application manager and a client application assistant to be utilized in executing the requests to perform the action.

3. The method of claim 2, wherein verifying the security of the IPC connection comprises a successful validation of a synchronization message, an authentication message and an authentication response message between the client application manager and the client application assistant across the IPC connection.

4. The method of claim 1, further comprising validating the action for the second application prior to execution of the action for the second application.

5. The method of claim 1, wherein the elevated privilege remains for a duration of a secure connection.

6. The method of claim 1, wherein the action is authenticated using a digital signature.

7. The method of claim 1, wherein:
   executing the action for the first application comprises installing the first application; and
   executing the action for the second application comprises installing the second application.

8. An apparatus for securely executing a plurality of actions using single prompt for privilege elevation comprising:
   at least one processor; and
   a non-transitory computer readable storage medium comprising instructions, which when executed by the at least one processor, cause the apparatus to perform a method comprising:
   receiving a request to perform an action for a first application, wherein performing the action for the first application requires an elevated privilege, the elevated privilege being elevated with respect to a current privilege;
   acquiring the elevated privilege to perform the action for the first application;
   executing the action for the first application, wherein the action is executed based on the acquired elevated privilege;
   receiving a second request to perform the action for a second application that differs from the first application, wherein performing the action for the second application requires an elevated privilege; and
   executing the action for the second application using the elevated privilege acquired for performing the action for the first application.

9. The apparatus of claim 8, wherein the method further comprises establishing an inter-process communication (IPC) connection.

10. The apparatus of claim 9, wherein the method further comprises verifying the security of the IPC connection, wherein verifying comprises a successful validation of a synchronization message, an authentication message and an authentication response message between a client application manager and a client application assistant across the IPC connection.

11. The apparatus of claim 8, wherein the method further comprises validating the action prior to the execution of the action for the second application.

12. The apparatus of claim 8, wherein the action is authenticated using a digital signature.

13. The apparatus of claim 8, wherein:
   executing the action for the first application comprises installing the first application; and
   executing the action for the second application comprises installing the second application.

14. A non-transitory computer readable medium storing computer instructions that, when executed by at least one processor, cause the at least one processor to perform a method for securely executing a plurality of actions using single prompt for privilege elevation comprising:
   receiving a request to download and install a first application, wherein downloading and installing the first application requires an elevated privilege to an administrator level, the elevated privilege being elevated with respect to a current privilege;
   acquiring the elevated privilege to for downloading and installing the first application;
   downloading and installing the first application based on the acquired elevated privilege for downloading and installing the first application;
   receiving a request to download and install a second application that differs from the first application, wherein downloading and installing the second application requires an elevated privilege to the administrator level; and
   downloading and installing the second application using the elevated privilege acquired for downloading and installing for the first application.

15. The non-transitory computer readable medium of claim 14, wherein the method further comprises establishing and verifying security of an inter-process communication (IPC) connection between a client application manager and a client application assistant to be utilized in executing the requests.

16. The non-transitory computer readable medium of claim 15, wherein verifying the security of the IPC connection comprises a successful validation of a synchronization message, an authentication message and an authentication response message between the client application manager and the client application assistant across the IPC connection.

17. The non-transitory computer readable medium of claim 14, wherein the method further comprises validating the download and install of the second application prior to execution of the download and the install of the second application.

18. The non-transitory computer readable medium of claim 14, wherein the elevated privilege remains for a duration of a secure connection.

19. The non-transitory computer readable medium of claim 14, wherein the download and the install of the second application is authenticated using a digital signature.

20. The non-transitory computer readable medium of claim 14, wherein: the acquired elevated privilege is specific for the first application.

\* \* \* \* \*